D. J. ROOF.
REVERSIBLE OR SIDEHILL PLOW.
APPLICATION FILED SEPT. 4, 1919.
1,332,272. Patented Mar. 2, 1920.
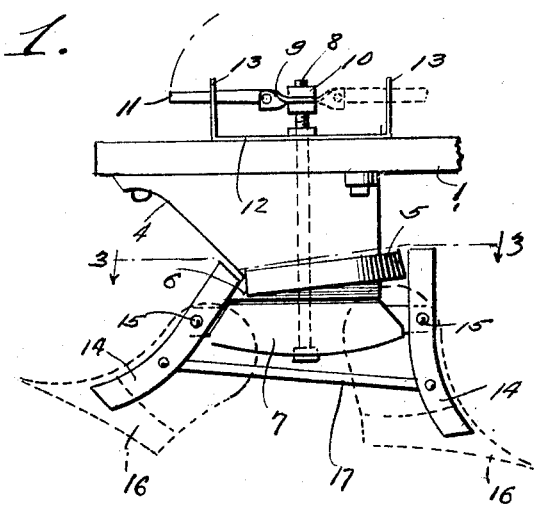
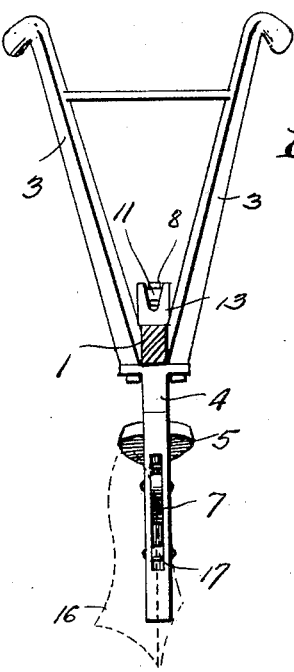
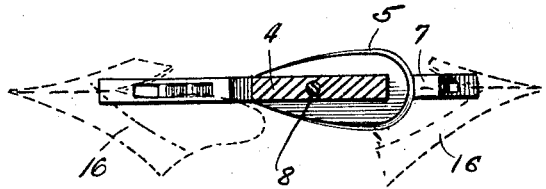
Inventor
Daniel Julian Roof

UNITED STATES PATENT OFFICE.

DANIEL JULIAN ROOF, OF GILBERT, SOUTH CAROLINA.

REVERSIBLE OR SIDEHILL PLOW.

1,332,272.  Specification of Letters Patent.  Patented Mar. 2, 1920.

Application filed September 4, 1919. Serial No. 321,633.

*To all whom it may concern:*

Be it known that I, DANIEL JULIAN ROOF, a citizen of the United States, residing at Gilbert, in the county of Lexington and State of South Carolina, have invented certain new and useful Improvements in Reversible or Sidehill Plows, of which the following is a specification.

The invention provides a plow which is particularly adapted for use on a hill, whereby a furrow may be formed when crossing and recrossing the ground, the plow being changed at the end of the furrow preliminary to recrossing the ground so that the earth may be thrown down hill when forming the furrow.

The invention provides novel means for mounting complemental plow shovels so that either one may be quickly thrown into operative position and held in place so as to effectively perform the work.

The drawing illustrates a preferred embodiment of the invention. However, it is to be understood that in adapting the same to meet different conditions, various changes in the form, proportion, and minor details of construction may be resorted to without departing from the nature of the invention as claimed hereinafter.

The drawing illustrates an embodiment of the invention and on reference thereto:—

Figure 1 is a side view of a reversible plow constructed in accordance with the invention.

Fig. 2 is a rear view thereof.

Fig. 3 is a horizontal section on the line 3—3 of Fig. 1.

Corresponding and like parts are referred to in the following description and indicated in the several views of the drawing, by like reference characters.

The plow comprises a beam 1 is provided with handle bars 3. A standard 4 is secured to the beam 1 and its lower end is provided with a cam 5 and a projection 6. The cam 5 is approximately of oval shape and is disposed with similar portions upon opposite sides of the standard 4. The cam occupies a relatively horizontal position. The projection 6 is about in the plane of the cam 5.

A relatively short bar 7 is pivotally connected midway of its ends to the lower end of the standard 4 so as to turn about a vertical axis. A shaft 8 journaled vertically in the standard 4 and beam 1 has the bar 7 secured to its lower end so that the shaft and bar turn together. An arm 9 is secured to the upper end of the shaft 8 and is firmly clamped between a pair of nuts 10 threaded upon the upper end of the shaft. A lever 11 is pivoted to the arm 9 and serves as convenient means for turning the shaft to reverse the plow and as securing means to hold the plow in the adjusted position. A bracket 12 secured to the beam 1 has its end portions extending upwardly, as indicated at 13 and notched in their upper ends to receive the lever 11 and thereby hold said lever in either one of its extreme positions, as shown by the full and dotted lines in Fig. 1. The ends of the bar 7 are reduced and standards 14 are pivoted thereto at 15. The standards 14 project above their pivot connection with the bar 7 so as to engage the lower portion of the standard 4. The upper end of one of the standards 14 engages the projection 6, whereas the upper end of the other standard 14 engages the cam 5. In this manner the shovel carried by one of the standards 14 is held out of action, whereas the shovel carried by the other standard is held in operative position. Plow shovels 16 are secured to the lower ends of the standards 14, one of such shovels being right hand and the other shovel left hand. When plowing the side of a hill in one direction, one of the shovels 16 is brought into operative position so as to throw the slice of earth down hill. When the end of the furrow has been reached, the bar 7 is reversed so as to bring the other plow shovel in position for operation upon recrossing the side of the hill. The bar 7 is operated by means of the lever 11. To reverse the plow, the end of the lever 11 is grasped and lifted to disengage it from the upright 13 of the bracket after which the lever is swung to the opposite position and engaged with the other upright of the bracket 12. During the turning of the bar 7, the upper ends of the standards 14 ride upon the cam 5 and one of the plow shovels is thrown into operative position and the other brought into inoperative position, it being understood only one of the plow shovels is brought into active operation at a time. A rod 17 connects the lower ends of the standards 14, whereby both standards are caused to move simultaneously when adjusting the plow.

Having thus fully described my inven- tion, what I claim as new and desire to secure by Letters Patent is:—

1. In a reversible plow, a standard, a bar pivoted intermediate of its ends to the standard, other standards provided with plow shovels pivoted near their upper ends to opposite ends of the said bar, a rod connecting the lower ends of the shovel bearing standards to cause them to move in unison and means carried by the lower end of the main standard and coacting with the upper ends of the shovel bearing standards to effect reversing thereof when turning the bar from one position to another.

2. In a reversible plow, a main standard, a horizontally disposed cam at the lower end of the standard, a bar pivoted intermediate of its ends to the main standard, shovel bearing standards pivoted to opposite ends of the bar and having their upper ends projecting to coöperate with the said cam, a rod connecting the lower ends of the shovel bearing standards and means for turning the bar and holding it in the required adjusted position.

3. In a plow, a beam, a standard carried by the beam, a vertical shaft mounted in the standard and beam, a bar secured to the lower end of the shaft to turn therewith, a lever at the upper end of the shaft and serving as means to effect a turning thereof, means mounted upon the beam to engage the lever and hold it in the adjusted position, shovel bearing standards pivoted near their upper ends to opposite ends of the bar, connecting means between the shovel bearing standards to cause them to move in unison and means at the lower end of the main standard and coöperating with the upper ends of the shovel bearing standards to hold the latter in the required adjusted position.

4. A side hill plow, comprising a beam, a standard carried by the beam, a cam and projection at the lower end of the standard, a vertical shaft mounted in the standard and beam, a bar secured intermediate of its ends to the shaft to turn therewith, shovel bearing standards pivoted near their upper ends to the bar and adapted to have their upper ends coact with the said cam and projection, means connecting the shovel bearing standards to cause them to move in unison, a lever at the upper end of the shaft and means carried by the beam to coact with the lever to hold it in the required adjusted position.

In testimony whereof I affix my signature in the presence of two witnesses.

DANIEL JULIAN ROOF.

Witnesses:
T. C. CALLISON,
C. J. SOX.